United States Patent
Leong

(10) Patent No.: US 11,867,155 B2
(45) Date of Patent: Jan. 9, 2024

(54) METHOD FOR PROVIDING A WIND TURBINE BLADE WITH LIGHTNING PROTECTION AND A WIND TURBINE BLADE

(71) Applicant: Siemens Gamesa Renewable Energy A/S, Brande (DK)

(72) Inventor: Martin Leong, Tjele (DK)

(73) Assignee: SIEMENS GAMESA RENEWABLE ENERGY A/S

(*) Notice: Subject to any disclaimer, the term of this patent is extended or adjusted under 35 U.S.C. 154(b) by 25 days.

(21) Appl. No.: 16/810,040

(22) Filed: Mar. 5, 2020

(65) Prior Publication Data
US 2020/0291926 A1 Sep. 17, 2020

(30) Foreign Application Priority Data
Mar. 14, 2019 (EP) ..................... 19162950

(51) Int. Cl.
*F03D 80/30* (2016.01)
*F03D 80/50* (2016.01)

(52) U.S. Cl.
CPC ............. *F03D 80/30* (2016.05); *F03D 80/50* (2016.05); *F05B 2230/80* (2013.01); *Y02E 10/72* (2013.01)

(58) Field of Classification Search
CPC .......... F03D 80/30; F03D 80/50; B64D 45/02
See application file for complete search history.

(56) References Cited

U.S. PATENT DOCUMENTS

| | | | |
|---|---|---|---|
| 3,416,027 A * | 12/1968 | Amason | H01Q 1/42 313/325 |
| 7,198,471 B2 | 4/2007 | Gunneskov et al. | |
| 8,641,374 B2 * | 2/2014 | Byreddy | B08B 1/008 415/232 |
| 10,113,531 B2 * | 10/2018 | Caruso | B29C 73/10 |
| 10,823,139 B2 * | 11/2020 | Hallissy | F03D 80/30 |
| 11,015,582 B2 * | 5/2021 | Barton | F03D 1/0675 |
| 11,154,955 B2 * | 10/2021 | Ota | B29C 73/04 |
| 11,359,599 B2 * | 6/2022 | Tangager | F03D 13/10 |
| 2005/0150596 A1 * | 7/2005 | Vargo | B32B 15/08 156/324 |
| 2008/0206059 A1 | 8/2008 | Hancock et al. | |

(Continued)

FOREIGN PATENT DOCUMENTS

| | | |
|---|---|---|
| EP | 2963289 A1 | 1/2016 |
| EP | 3504428 A1 | 7/2019 |

(Continued)

OTHER PUBLICATIONS

NPL Wind Turbine Design, Feb. 11, 2019, Wikipedia, (Year: 2019).*

(Continued)

*Primary Examiner* — Igor Kershteyn
*Assistant Examiner* — Wesley Le Fisher
(74) *Attorney, Agent, or Firm* — Schmeiser, Olsen & Watts LLP

(57) ABSTRACT

A method for providing a wind turbine blade with lightning protection, the method including the steps of: providing a lightning protection cover including a non-conductive medium and a conductive medium embedded in the non-conductive medium, providing a blade body, and attaching the lightning protection cover to the blade body. An effective lightning protection is thus provided.

10 Claims, 3 Drawing Sheets

(56) References Cited

U.S. PATENT DOCUMENTS

| | | |
|---|---|---|
| 2010/0047074 A1 | 2/2010 | Hernandez et al. |
| 2010/0329881 A1 | 12/2010 | Mendez Hernandez et al. |
| 2011/0142678 A1* | 6/2011 | Santiago ................. F03D 80/30 416/241 R |
| 2011/0305574 A1* | 12/2011 | Stiesdal ................. F03D 80/30 416/146 R |
| 2012/0282097 A1* | 11/2012 | Lewke .................... F03D 80/00 416/146 R |
| 2013/0149145 A1* | 6/2013 | Shibata .................. F03D 80/40 416/61 |
| 2013/0149154 A1 | 6/2013 | Kuroiwa et al. |
| 2016/0090968 A1* | 3/2016 | Hansen ................ F03D 1/0675 416/146 R |
| 2016/0177915 A1* | 6/2016 | Gonzalez ............. F03D 1/0675 416/223 R |
| 2018/0112649 A1* | 4/2018 | Shain .................... F03D 1/0675 |
| 2018/0328346 A1* | 11/2018 | Martin .................. B32B 27/281 |
| 2019/0111528 A1* | 4/2019 | Ota .......................... B29C 73/00 |
| 2019/0226458 A1* | 7/2019 | Sanderson ............. F03D 80/50 |
| 2020/0080545 A1 | 3/2020 | van Truong et al. |
| 2020/0232445 A1* | 7/2020 | Lindskog ................ B29C 73/34 |

FOREIGN PATENT DOCUMENTS

| | | | |
|---|---|---|---|
| EP | 3536947 A1 | 9/2019 | |
| EP | 3578806 A1 | 12/2019 | |
| EP | 3633186 A1 | 4/2020 | |
| JP | 2002227757 A * | 8/2002 | ............ F03D 80/30 |
| JP | 2007100658 A * | 4/2007 | |
| WO | WO-2011080177 A1 * | 7/2011 | ........... F03D 1/0641 |
| WO | 2013084361 A1 | 6/2013 | |
| WO | 2015185065 A1 | 12/2015 | |
| WO | WO-2015185065 A1 * | 12/2015 | ............ F03D 80/30 |
| WO | 2016075619 | 5/2016 | |
| WO | 2018060297 A1 | 4/2018 | |
| WO | 2018060298 A1 | 4/2018 | |
| WO | 2018219511 A1 | 12/2018 | |
| WO | 2019007471 A1 | 1/2019 | |

OTHER PUBLICATIONS

English translation of JP2002227757A (Year: 2002).*
English translation of JP2007100658A (Year: 2007).*
European Search Report and Written Opinion of the European Searching Authority dated Oct. 1, 2019 for Application No. 19162950.0.

* cited by examiner

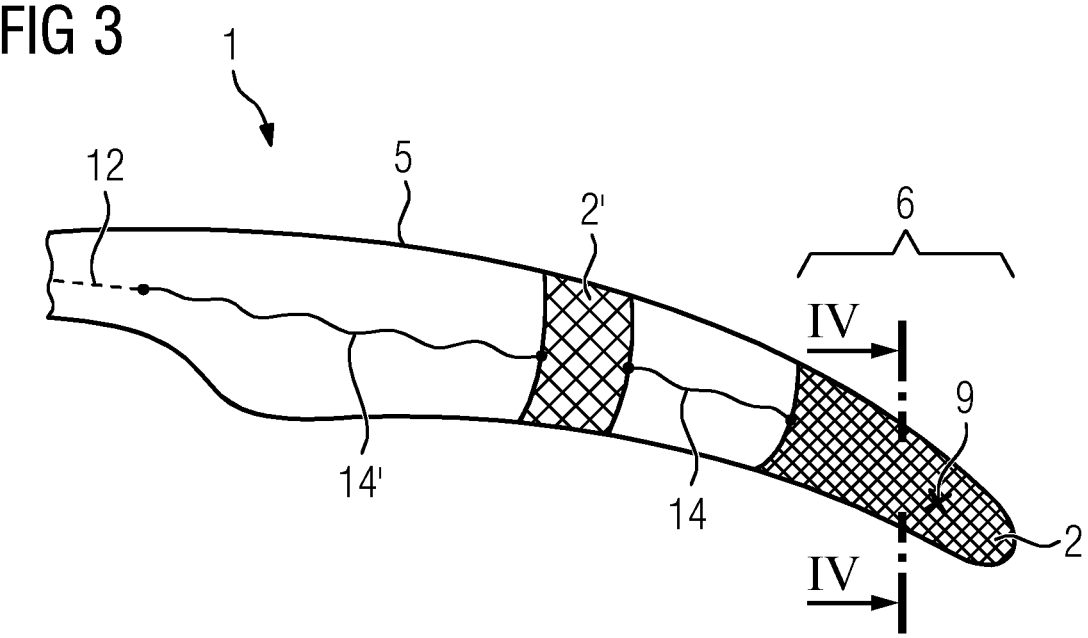
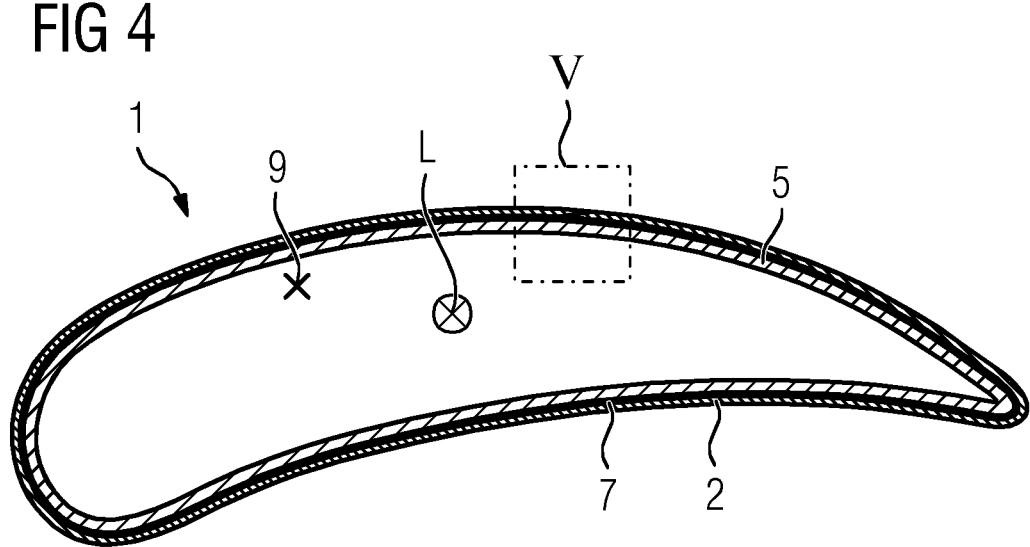

METHOD FOR PROVIDING A WIND TURBINE BLADE WITH LIGHTNING PROTECTION AND A WIND TURBINE BLADE

CROSS-REFERENCE TO RELATED APPLICATIONS

This application claims priority to EP Application No. 19162950.0, having a filing date of Mar. 14, 2019, the entire contents of which are hereby incorporated by reference.

FIELD OF TECHNOLOGY

The following relates to a method for providing a wind turbine blade with lightning protection and a corresponding wind turbine blade.

BACKGROUND

Lightning damage is one of the primary drivers of operation and maintenance cost for wind turbine blades during operation since even wind turbine blades with a fully functional lightning protection system can be subjected to damage during a lightning event.

Typical damages can range from being superficial to compromising the structural integrity of a wind turbine blade. Such damage may necessitate repair work on the wind turbine blade using a crane which is costly and time-consuming.

Moreover, variations in the production of wind turbine blades can potentially increase the risk of a lightning strike damaging the wind turbine blade. Variations may be random or systematic and may be represented by air pockets in the laminate of the wind turbine blade or by casting in foreign objects. Although such variations would otherwise not compromise the integrity or performance of the wind turbine blade and the wind turbine in general, the likelihood of a damage caused by a lightning strike is increased.

Conventionally, operators of wind turbines follow a reactive approach which involves waiting until a damage caused by a lightning strike occurs and subsequently repairing the damage by up-tower means or replacement of the wind turbine blade. Moreover, a known proactive remediation of variations in the blade which have been identified comprises grinding of the laminate of the wind turbine blade until a variation has been removed and afterwards restoring the laminate by hand lamination using a lifting platform or a rope access. According to an alternative solution, a wind turbine blade is even lowered to the ground for repair work or replacement.

US 2010/0047074 A1 discloses an example of a wind turbine lightning protection system which comprises a blade, wherein a tip portion of the blade may comprise a conductive material like a metal mesh and the remaining part of the blade is optionally covered by paint which may be conductive, semi-conductive or non-conductive.

Further, US 2010/329881 A1 discloses another example of a lightning protection system for a wind turbine, wherein a metal mesh or a metal foil is incorporated into a skin material of a wind turbine blade.

SUMMARY

An aspect relates to provide an improved method for reducing damage to wind turbine blades and a corresponding wind turbine blade.

Accordingly, a method for providing a wind turbine blade with lightning protection is provided. The method comprises providing a lightning protection cover comprising a non-conductive medium and a conductive medium embedded in the non-conductive medium, providing a blade body, and attaching the lightning protection cover to the blade body.

The method is advantageous in that a lightning protection can be proactively provided for a wind turbine blade with low installation effort since cumbersome grinding and hand lamination processes are not required. Moreover, lowering the wind turbine blade may also not be required anymore since the installation of the lightning protection can be conducted faster due to its simplicity. In addition to that, the wind turbine blade itself may be better protected when hit by lightning since the lightning protection cover is attached to the blade body but does not form an integral part of the blade.

Hence, by covering a certain area of the blade body, for example where a systematic variation (in particular defect) is expected, it is possible to effectively protect the structure of the wind turbine blade from lightning strike damage. Accordingly, electric current of a lightning strike is directed to a conductive medium while the protected object, namely the blade body, remains unharmed.

By embedding the conductive material in the non-conductive material, the lightning protection cover can be applied on high wear areas of the blade body, such as the leading edge, and will have minimal impact on the aerodynamics of the blade, as the surface of the lightning protection cover remains smooth.

The blade body comprises a fiber composite material which is fully cured when the lightning protection cover is attached thereto.

According to an embodiment, the lightning protection cover is attached to the blade body with an adhesive medium.

Using an adhesive medium allows an installation of the lightning protection cover in a quick and easy way.

Alternatively, a bond between the lightning protection cover and the blade body may be created by the non-conductive medium itself (i.e. without an additional adhesive). For example, the conductive medium is placed on the blade body's outer surface, and the non-conductive medium is casted onto the blade body, thus embedding into the non-conductive medium.

According to a further embodiment, the adhesive medium is an epoxy-based glue.

According to a further embodiment, the adhesive medium is configured to allow a reversible attachment of the lightning protection cover to the blade body.

For example, a pressure-sensitive adhesive may be used to achieve such reversible attachment of the lightning protection cover to the blade body. The pressure-sensitive adhesive sticks to the blade body by forming a bond when pressure is applied to the lightning protection cover after aligning it on the blade body.

According to a further embodiment, the method comprises applying the adhesive medium to the non-conductive medium before attaching the lightning protection cover to the blade body.

This further simplifies the installation of the lightning protection cover since a technician does not have to cumbersomely handle attachment means during installation of the lightning protection cover.

According to a further embodiment, attaching the lightning protection cover comprises bending the lightning protection cover to follow the shape of the blade body.

According to a further embodiment, attaching the lightning protection cover comprises fully surrounding, with the lightning protection cover, the blade body when seen in a cross section taken at right angles to the blade body's longitudinal axis.

Fully surrounding the blade body with the lightning protection cover has the advantage that the operating principle of a corona ring is achieved which is a simplified two-dimensional form of a Faraday cage.

According to a further embodiment, attaching the lightning protection cover comprises encasing, with the lightning protection cover, a tip of the blade body.

This is particularly advantageous since the tip of the blade body is the highest point of a wind turbine generator and thus susceptible to lightning strikes.

According to a further embodiment, the method comprises identifying a defective area on or within the blade body, and attaching the lightning protection cover on top of the defective area to the blade body.

This allows a proactive protection against lightning strikes in areas that are considered particularly susceptible.

According to a further embodiment, the defective area is identified using an X-ray analysis and/or a high-frequency measurement.

According to a further embodiment, the method comprises electrically connecting the conductive medium of the lightning protection cover to ground using a lightning protection system of the wind turbine blade.

To this end, the lightning protection cover may comprise at least one connection terminal which is in electrical connection with the conductive medium. By discharging lightning strikes to ground, damage to the wind turbine blade can be effectively avoided.

According to a further embodiment, the method comprises attaching a further lightning protection cover, comprising a non-conductive medium and a conductive medium embedded in the non-conductive medium, to the blade body of the wind turbine blade and connecting the conductive medium of the lightning protection cover to the conductive medium of the further lightning protection cover.

Such a solution is particularly advantageous when there are several impaired or defective areas on or within the blade body.

According to a further embodiment, the conductive medium is a metallic mesh or a metallic foil.

Instead or in addition, the conductive medium is made of carbon fibers, for example. Examples of suitable metals are aluminum and copper.

According to a further embodiment, the non-conductive medium comprises a polymer, preferably a polyurethane. The polymer may be formed as a foam and/or may comprise reinforcing fibers. Furthermore, the non-conductive medium is so selected as to have flexible and/or durable properties.

According to a further aspect, a wind turbine blade is provided, the wind turbine blade comprising a blade body, and a lightning protection cover attached to the blade body, the lightning protection cover comprising a non-conductive medium, and a conductive medium embedded in the non-conductive medium.

The embodiments and features described with reference to the method of embodiments of the present invention apply mutatis mutandis to the apparatus of embodiments of the present invention.

Further possible implementations or alternative solutions of embodiments of the invention also encompass combinations—that are not explicitly mentioned herein—of features described above or below with regard to the embodiments. The person skilled in the art may also add individual or isolated aspects and features to the most basic form of embodiments of the invention.

BRIEF DESCRIPTION

Some of the embodiments will be described in detail, with reference to the following figures, wherein like designations denote like members, wherein:

FIG. 3 shows, in a side view, a wind turbine blade having two lightning protection covers attached to the blade body;

FIG. 4 shows, in cross-section, the wind turbine blade of FIG. 3 in the area of the blade body's tip;

In the Figures, like reference numerals designate like or functionally equivalent elements, unless otherwise indicated.

DETAILED DESCRIPTION

Figure 1:
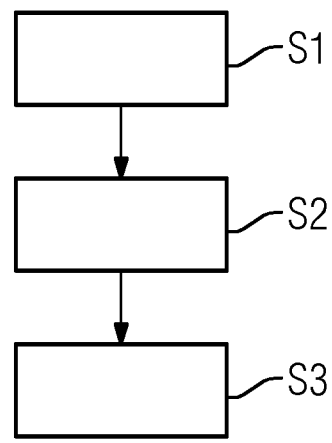
FIG. 1 shows a flowchart illustrating a method for providing a wind turbine blade with lightning protection.

FIG. 1 shows a flowchart illustrating a method for providing a wind turbine blade 1 with lightning protection.

In a step S1, a lightning protection cover 2 (see FIG. 2) is provided. The lightning protection cover 2 comprises a non-conductive medium 3 and a conductive medium 4 embedded in the non-conductive medium 3. According to the present embodiment, the conductive medium 4 is a metallic mesh, whereas the non-conductive medium 3 is a polymer foam.

In a step S2, a blade body 5 (see FIG. 3) of the wind turbine blade 1 is provided. The blade body 5 is made of a fiber composite material comprising fibers bonded to each other using a resin, particularly an epoxy-based resin. The blade body 5 is produced by an autoclave process.

In a step S3, the lightning protection cover 2 is attached to the outer surface of the blade body 5, in particular on top of a defective area 9. This is for example done by bending the lightning protection cover 2 to follow the shape of the blade body 5 and subsequently attaching the lightning protection cover 2 to the blade body 5.

The defective area 9 may be formed on or within the blade body 5. The defective area 9 for example comprises an air pocket or a metallic object (e.g. a thermocouple) casted in during manufacturing of the blade body 5. Such defective areas 9 are particularly prone to being hit by lightning. They may be identified by X-ray analysis or a high-frequency measurement directly after production of the blade body 5 or when the blade body 5 has already been in operation mounted to a wind turbine 10 (see FIG. 6).

It is to be noted that the wind turbine blade 1 refers to a blade body 5 to which the lightning protection cover 2 has already been attached, whereas the blade body 5 refers to an unprotected component.

Figure 2:
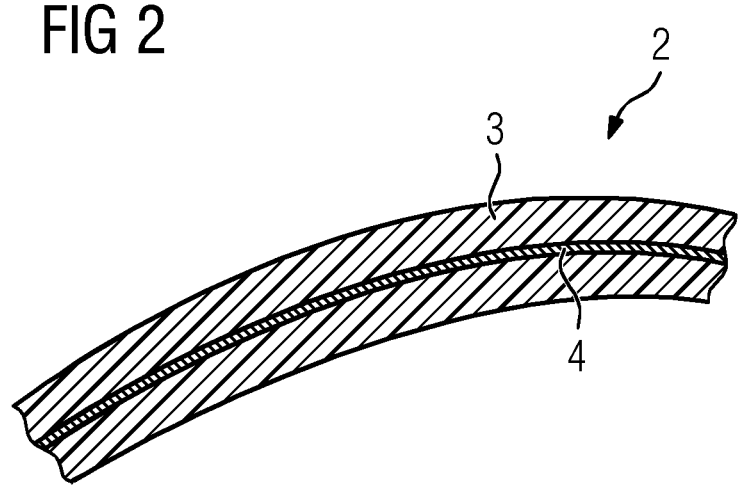
FIG. 2 shows, in cross-section, a lightning protection cover comprising a non-conductive medium and a conductive medium embedded in the non-conductive medium.

FIG. 2 shows a lightning protection cover 2 comprising a non-conductive medium 3 and a conductive medium 4 embedded in the non-conductive medium 3.

It is apparent from FIG. 2 that the conductive medium 4 is fully embedded in the non-conductive medium 3 which means that there is no connection of the conductive medium 4 to other electrically conductive components. However, it is also possible that the conductive medium 4 is only partially embedded in the non-conductive medium 3 as will be discussed later with reference to FIGS. 3 and 5 since an electrical connection of the conductive medium 4 to other components may be required.

FIG. 3 shows a wind turbine blade 1 having two lightning protection covers 2 and 2' attached to the blade body 5.

According to the embodiment shown in FIG. 3, the lightning protection cover 2 encases a tip 6 of the blade body 5 since a defective area 9 has been identified on the blade body 5. Hence, a lightning protection is achieved for a wind turbine blade 1 which takes into account that the tip 6 of the blade body 5 is most susceptible to lightning strikes, particularly if there is a defective area 9.

Since the tip 6 is protected by means of the lightning protection cover 2, the energy of a lightning strike which hits the wind turbine blade 1 is received by the conductive material 4 of the lightning protection cover 2 which serves as a corona ring, i.e. a two-dimensional Faraday cage. Damage from the blade body 5 is thus kept away, particularly since the lightning protection cover 2 does not form an integral part of the blade body 5 (i.e. is a separate component) but is rather attached to the same.

In the same manner, a further lightning protection cover 2' is attached to the wind turbine blade 1, thereby fully surrounding the same. The further lightning protection cover 2' also comprises a non-conductive medium 3 and a conductive medium 4 embedded in the non-conductive medium 3. According to the embodiment of FIG. 3, the conductive medium 4 of the lightning protection cover 2 is connected to the conductive medium 4 of the further lightning protection cover 2' via a cable 14. Moreover, the further lightning protection cover 2' is also connected to a (an existing) lightning protection system 12 of the wind turbine 10 via a cable 14' which will be explained with reference to FIG. 6.

FIG. 4 shows the wind turbine blade 1 of FIG. 3 in the area of the blade body's tip 6.

Hence, the lightning protection cover 2 is fully surrounding the blade body 5 when seen in a cross section taken at right angles to the blade body's longitudinal axis L. Since fully surrounding the blade body 5 with the lightning protection cover 2 may, in particular, lead to the above-mentioned operating principle of a corona ring, a particularly efficient protection against lightning strikes is given.

Moreover, it is apparent from FIG. 4 that the lightning protection cover 2 is attached to the blade body 5 with an adhesive medium 7, particularly an epoxy-based glue or similar. The adhesive medium 7 may be configured to allow a reversible attachment of the lightning protection cover 2 to the blade body 5. That is, the lightning protection cover 2 can be easily removed and replaced in case of being damaged due to a lightning strike.

Figure 5:
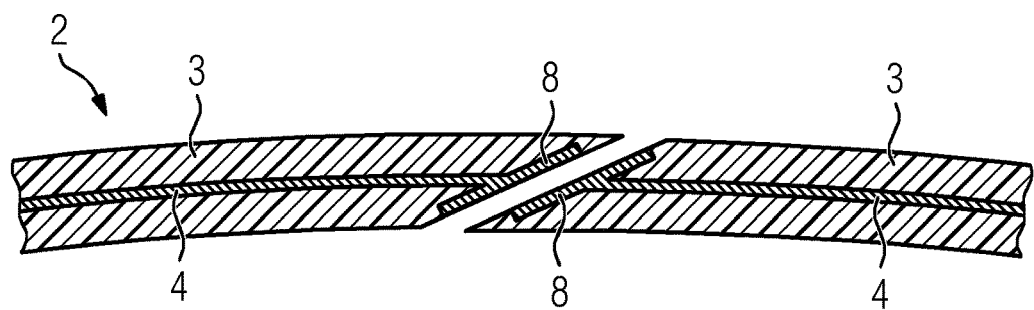
FIG. 5 shows, in cross-section, the lightning protection cover of FIG. 4 with overlapping ends.

FIG. 5 shows a lightning protection cover 2 with overlapping end portions according to an embodiment.

The lightning protection cover 2 comprises a non-conductive medium 3 and a conductive medium 4 embedded in the non-conductive medium 3. According to FIG. 5, the lightning protection cover 2 fully surrounds the blade body 5 of a wind turbine blade 1 as indicated in FIG. 4 in cross-section. Each of the end portions of the lightning protection cover 2 comprises a connection terminal 8, wherein the connection terminals 8 of the end portions are in electrical connection with each other (FIG. 5 shows a gap still being present which is closed in the connected state).

Providing connection terminals 8 at end portions of the lightning protection cover 2 allows the lightning protection cover 2 to have a closed loop corresponding to a corona ring. In the present embodiment, the end portions (e.g. formed with skew ends) overlap each other to achieve a connection of the connection terminals 8. Alternatively, the closed loop may be established using an additional conductive element such as wire or a cable.

Figure 6:
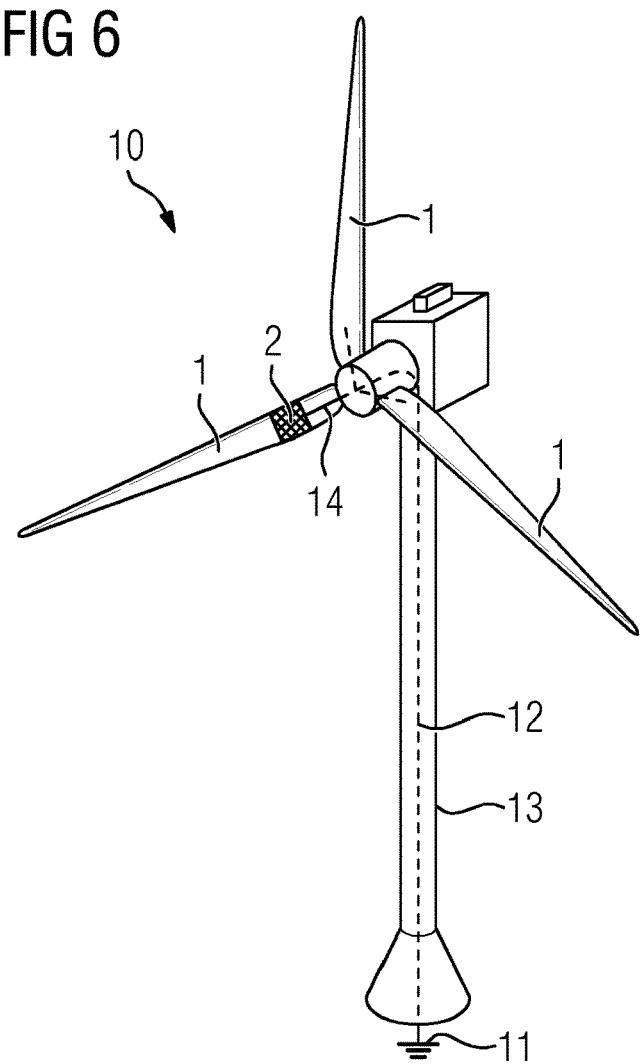
FIG. 6 shows, in a perspective view, a wind turbine with a lightning protection system to which a lightning protection cover is connected.

FIG. 6 shows a wind turbine 10 with a lightning protection system 12 to which a lightning protection cover 2 is connected.

The lightning protection system 12 of the wind turbine 10 extends up the tower 13 of the wind turbine 10 to the wind turbine blades 1 and serves to discharge energy when hit by lightning to ground 11. For that purpose, the conductive medium 4 of the lightning protection cover 2 which is arranged on a wind turbine blade 1 is electrically connected to the lightning protection system 12 via a cable 14 and thus electrically connected to ground 11.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method for providing a wind turbine blade with lightning protection, the method comprising the steps of:
    providing a lightning protection cover comprising a non-conductive medium and a conductive medium embedded in the non-conductive medium,
    providing a blade body comprising a fiber composite material which is fully cured,
    providing a further lightning protection cover comprising a second non-conductive medium and a second conductive medium embedded in the second non-conductive medium,
    identifying a defective area on or within the blade body, wherein the defective area includes a defect that makes the defective area prone to being hit by lightning, wherein the defect comprises an air pocket or a metallic object,
    attaching the lightning protection cover to the blade body, wherein attaching the lightning protection cover comprises encasing, with the lightning protection cover, a tip of the blade body,
    attaching the further lightning protection cover to the blade body of the wind turbine blade and connecting the conductive medium of the lightning protection cover to the second conductive medium of the further lightning protection cover, wherein attaching the further lightning protection cover comprises fully surrounding, with the further lightning protection cover, the blade body when seen in a cross section taken at right angles to a longitudinal axis of the blade body, wherein the further lighting protection cover is attached at a distance from the lightning protection cover,
    connecting the second conductive medium of the further lightning protective cover to an existing lightning protection system of a wind turbine, wherein the existing lightning protection system of the wind turbine is electrically connected to ground, wherein the lightning protection cover and/or the further lightning protection cover are attached to the blade body with an adhesive medium, and wherein the lightning protection cover or the further lightning protection cover is attached on top of the defective area on or within the blade body.

2. The method according to claim 1, wherein the adhesive medium is an epoxy-based glue.

3. The method according to claim 1, wherein the adhesive medium is configured to allow a reversible attachment of the lightning protection cover and/or the further lightning protection cover to the blade body.

4. The method according to claim 1, further comprising applying the adhesive medium to the non-conductive medium before attaching the lightning protection cover to the blade body and/or applying the adhesive medium to the second non-conductive medium before attaching the further lightning protection cover to the blade body.

5. The method according to claim 1, wherein attaching the lightning protection cover comprises bending the lightning protection cover to follow the shape of the blade body and/or attaching the further lightning protection cover comprises bending the further lightning protection cover to follow the shape of the blade body.

6. The method according to claim 1, wherein the defective area is identified using an X-ray analysis and/or a high-frequency measurement.

7. The method according to claim 1, wherein the conductive medium and/or the second conductive medium is a metallic mesh or a metallic foil.

8. The method according to claim 1, wherein the non-conductive medium and/or the second non-conductive medium comprises a polymer.

9. A wind turbine blade, comprising:
a blade body made of a fully cured fiber composite material;
a lightning protection cover attached to the blade body, wherein the lightning protection cover includes a non-conductive medium and a conductive medium embedded in the non-conductive medium, and wherein the lightning protection cover encases a tip of the blade body; and
a further lightning protection cover attached to the blade body at a distance from the lightning protection cover, wherein the further lightning protection cover includes a second non-conductive medium and a second conductive medium embedded in the second non-conductive medium, wherein the further lightning protection cover fully surrounds the blade body when seen in a cross section taken at right angles to a longitudinal axis of the blade body;

wherein the conductive medium of the lightning protection cover is electrically connected to the second conductive medium of the further lighting protection cover and the second conductive medium of the further lightning protective cover is electrically connected to a lightning protection system of a wind turbine, wherein the lightning protection system of the wind turbine is electrically connected to ground;

wherein the lightning protection cover and/or the further lightning protection cover are attached to the blade body with an adhesive medium, and wherein the lightning protection cover or the further lightning protection cover is attached on top of a defective area on or within the blade body, wherein the defective area comprises an air pocket or a metallic object casted in during manufacturing of the blade body.

10. A method for providing a wind turbine blade with lightning protection, the method comprising the steps of:
providing a blade body comprising a fiber composite material which is fully cured,
providing a lightning protection cover comprising a non-conductive medium and a conductive medium embedded in the non-conductive medium,
identifying a defective area on or within the blade body, wherein the defective area includes a defect that makes the defective area prone to being hit by lightning, wherein the defect comprises an air pocket or a metallic object casted in during manufacturing of the blade body, and
attaching the lightning protection cover to the blade body, wherein the lightning protection cover is attached to the blade body with an adhesive medium, and wherein the lightning protection cover at least partially covers the defective area.

* * * * *